Oct. 22, 1963 T. R. THOREN ETAL 3,107,626
BOOSTER PUMPS
Filed Jan. 8, 1962 2 Sheets-Sheet 2

Inventors:
Theodore R. Thoren
and David C. Marsh
By: W. S. McCurry Atty.

3,107,626
BOOSTER PUMPS
Theodore R. Thoren and David C. Marsh, Chagrin Falls, Ohio, assignors to Borg-Warner Corporation, Chicago, Ill., a corporation of Illinois
Filed Jan. 8, 1962, Ser. No. 164,785
4 Claims. (Cl. 103—113)

This invention relates in general to the pumping of liquid, and is particularly concerned with an improvement in booster pumps for delivering highly volatile fuel from a source, such as an aircraft tank, to an engine fuel pump or to a point of consumption, such as the aircraft engine itself.

In the continued development of aircraft for higher altitudes, faster acceleration, and better maneuverability it has been found that prior art booster pumps have been found not to operate satisfactorily in certain aircraft flight attitudes, or in inverted (negative g) flight conditions because the pump inlet will become airblocked or starved thereby causing aircraft engine failure.

However, in U.S. Patent No. 2,925,043 to John R. Howe, issued February 16, 1960, and entitled "Booster Pump," there is disclosed a very practical and satisfactory fuel booster pump for operating under these adverse conditions by having an ability to be self-priming. As explained therein, conventional booster pumps have a tendency to become blocked by air or vapors under certain conditions such as, for example, when unusual flight attitudes cause the fuel in the tank to temporarily drop below the pump intake line. When a slug of air or vapor enters the pump intake line and reaches the pump inlet, the pump is unable to develop sufficient pressure to enable it to re-prime itself and draw fuel into the inlet. Accordingly, the present invention includes means in the form of a second pump having its inlet communicating with the booster pump for removing any air or vapor that may be present and assisting the withdrawal of fuel into the booster pump inlet.

The present invention relates to a modification or improvement over the type of fuel booster pump described and claimed in the aforementioned Howe patent in that the present booster pump is constructed and arranged so that the liquid ring pump, which is associated with the booster pump, is constantly maintained with a source of fuel to seal certain clearances therein and to enable the liquid ring pump to effectively withdraw air and vapors from said booster pump.

Accordingly, a primary object of this invention is the provision of a line mounted booster pump assembly meeting the needs of the aircraft industry and having the ability of maintaining a prime for the booster pump and providing a continuous supply of fuel regardless of the flight conditions.

Another object of the present invention is to provide an improved construction of a fuel booster assembly incorporating means which will maintain a continuous supply of sealing fluid to a liquid ring priming pump having its inlet communicating with the booster pump.

Other and more particular objects, advantages, and uses of this invention will become more apparent from the reading of the following description taken in connection with the accompanying drawings which form a part hereof and wherein.

In the various views of the drawings the same reference character is employed to refer to the same part.

Figure 1:
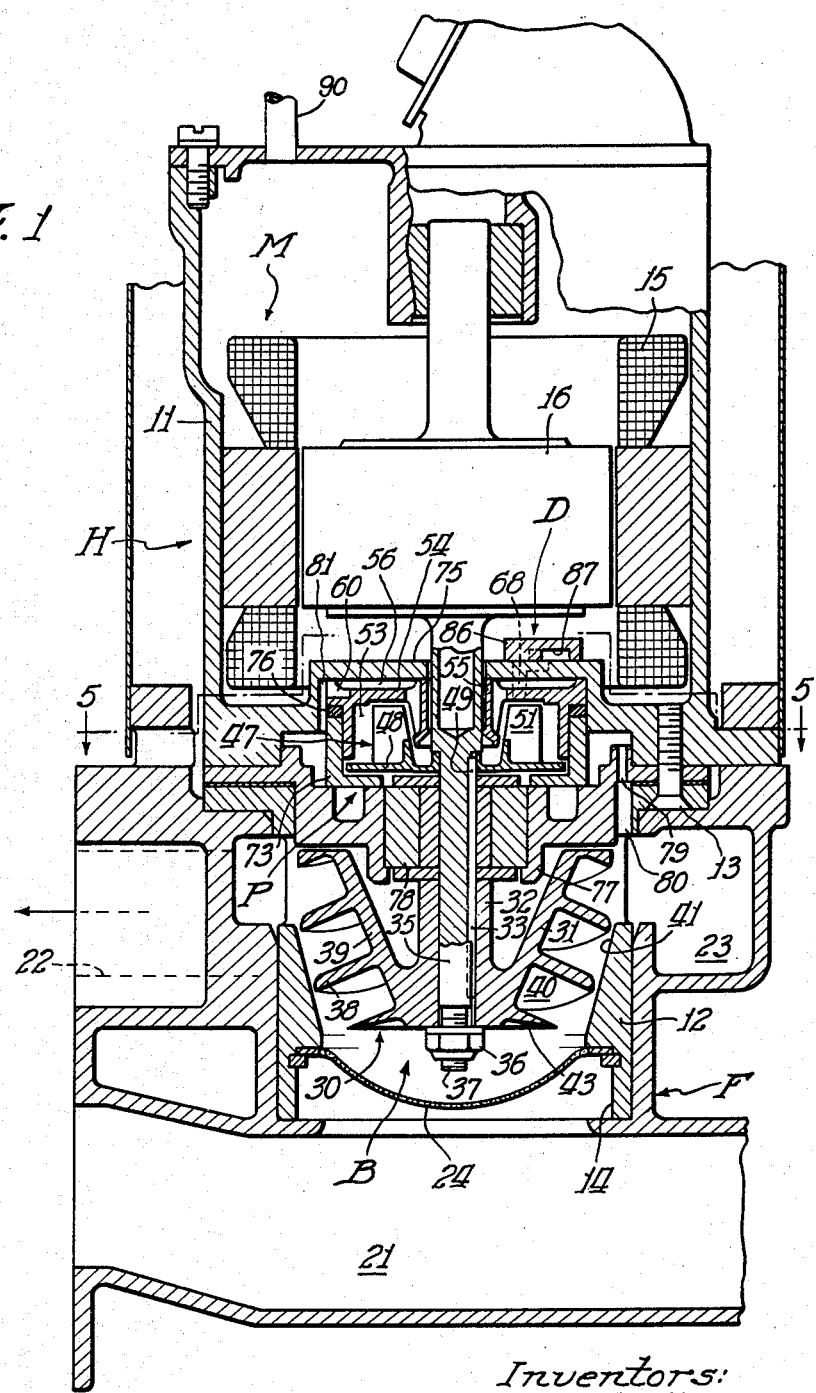
FIGURE 1 is a cross-sectional view of the improved booster pump assembly.

Referring now to the FIGURE 1 of the drawings, there is illustrated a vertically mounted fuel booster pump assembly comprising an electric motor M, which includes a stator 15 and an armature 16, remotely controlled in any conventional manner, a mixed flow type booster pump B and a second pump P, commonly known in the industry as a hydroturbine or liquid ring pump. Booster pump B, liquid ring pump P, and electric motor M are operatively and functionally enclosed within a housing H in the manner shown. A housing 11, containing the working parts of the motor M, and housing 12, containing the working parts of the booster pump assembly B and the second or liquid ring pump P, are connected by fastening means, such as bolts 13. The combined housings 11 and 12 are suitably connected to fuel inlet and outlet lines in a conventional "plug-in" line fitting generally indicated by F. Booster pump housing 12 is provided with a tubular inlet portion 14 which is plugged or screwed into the line fitting F which contains the outlet scroll 23. The inlet of the pump B is therefore in fluid communication with inlet line 21 and fluid is discharged into the scroll 23 communicating with discharge line 22. A screen 24 is normally provided in the housing 12 at the inlet 14 of the pump B for straining the fuel as it enters the pump.

The booster pump B comprises an impeller, indicated in its entirety by 30, having a cone-shaped portion 31 and an axially extending cylindrical portion 32, which is suitably keyed at 33 to motor shaft 35 to provide a driving connection therebetween. The impeller 30 is retained in its proper operating position on shaft 35 by means of a nut 36 received on the threaded portion 37 of the shaft.

Impeller 30 is provided with a plurality of spiral vanes 38, the number depending upon the volume of fuel to be pumped, extending substantially perpendicular to the surface 39 of the cone-shaped portion 31, thereby defining substantially rectangular grooves or passages 40 between the vanes 38. Fuel entering the pumping inlet 14 of the booster pump from the inlet conduit 21 is carried from the inlet edges 43 of the vanes 38 to discharge into the scroll 23 and the outlet 22 with a resulting increase in pressure being imposed upon the fuel, which results in condensation of the vapors in the liquid-vapor mixture.

The liquid ring pump P, constructed in accordance with the general principle described in U.S. Patent No. 1,718,294 to I. C. Jennings, issued June 25, 1929, comprises a rotor indicated in its entirety at 47, having a plate like portion 48 keyed at 49 or otherwise secured to the motor shaft 35 for conjoint rotation, and having a plurality of axially extending curved vanes or blades 51. The rotor 47 is received in a double lobe pumping chamber 53 partially enclosed by a radially and axially fixed, substantially cylindrical, lobe cone 54. The lobe cone 54 includes an axially extending truncated cone-shaped portion 55 surrounding and spaced from the motor shaft 35.

Figure 2:
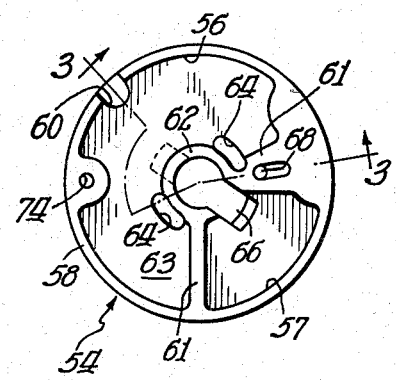
FIGURE 2 is a top plan view of the liquid ring pump lobe cone, a basic element in the liquid ring pump.
Figure 3:
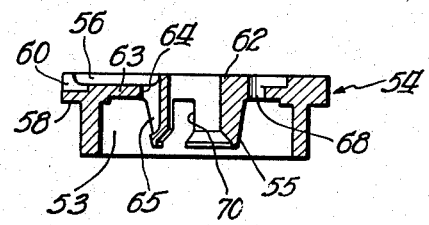
FIGURE 3 is a cross-sectional view of the liquid ring pump lobe cone taken on line 3—3 of FIGURE 2.
Figure 4:
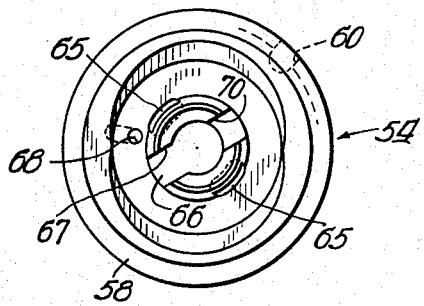
FIGURE 4 is a bottom plan view of the liquid ring pump lobe cone.

As shown in FIGURES 2 to 4, the lobe cone 54, in addition to the pumping chamber, is provided with a liquid ring pump inlet chamber 56 and a liquid ring pump discharge chamber 57, the chambers 56 and 57 being defined by an annular wall 58, slotted at 60 for a purpose to be described, common separating web-like walls 61, and a substantially circular wall 62 adjacent the motor shaft 35. One of the web-like walls 61 is provided with a passage 68 from the upper surface of wall 58 to the pumping chamber 53, the purpose of which will be clear from the following description. The chambers 56 and 57 are separated from the pumping chambers 53 by means of a common wall 63, which is provided with inlet passages 64, 64 intersecting grooves 65, 65 in the truncated cone-shaped portion 55 affording communication between the inlet chamber 56 and the pumping chamber 53, and which is also provided with an outlet passage 66 intersecting a slot 67 in the truncated cone-shaped portion 55 affording communication between the pumping chamber 53, the space around the motor shaft 35 and the discharge chamber 57. The truncated cone-shaped portion 55 is further provided with a discharge slot 70 affording communication between the pumping chamber 53 and the space around the motor shaft 35. Since the above-described pumping chamber actually defines two pumping chambers, the need for an outlet from each side is apparent and such outlets are provided in the form of slots 67 and 70.

The lobe cone 54 is retained in position, as viewed in FIGURE 1 of the drawings, between the bottom wall 75 of the motor housing 11 and an annular retainer 73. This bottom wall of the housing 11 is provided with one or more locating pins (not shown) adapted to be received in locator holes 74 in the lobe cone 54 (FIGURE 2). An O-ring 76 is normally positioned between the lobe cone and the retainer to compensate for manufacturing tolerances, but said O-ring has no sealing function. Shaft bearings 78 are supported by an annular bearing retainer member 77 which is secured to the motor housing 11 by bolts 13. The bearing retaining member 77 is provided with fluid passage means in the form of a plurality of small apertures 79 which afford fluid communication between the booster pump chamber and the liquid ring pump P. When an air or vapor block occurs, air, vapors and mixed vapors and liquid are withdrawn from the booster pump chamber to the inlet chamber of the liquid ring pump along a path defined by a groove 80 in the booster pump housing wall 12, the ports 79, a groove 81 in the bottom wall of the motor housing, and the slot 60 in the annular wall 58 of the lobe cone 54.

The bottom wall of the motor housing 75 is also provided with fluid passage means in the form of apertures 82 which afford fluid communication between the liquid ring pump discharge chamber 57 and the interior of the motor housing 11. Fluid discharged from the liquid ring pump chamber 57 is thus employed to cool the motor M by circulation in contact therewith. The fuel at least partially fills the motor chamber so that the armature spins in a bath of fuel and imparts a swirling motion thereto in the same direction as the rotation of the armature.

For proper operation of the liquid ring pump, the pumping chamber 53 must at all times have sufficient fluid to seal certain clearances within the chamber. A major problem encountered in using this type of pump is the failure of means to keep the pumping chamber from "going dry." In the aforementioned Howe patent, a return passage from the motor chamber to the pump chamber is described. However, it has been found in actual operation that the centrifugal force generated by the rapidly rotating motor armature tends to cause the liquid within the motor chamber to move so fast across the return inlet that the fluid within the motor chamber is effectively prevented from flowing therein. This phenomenon may be analogized to the situation where fluid in a conduit is flowing so rapidly past an aperture in the conduit that air is aspirated into the conduit rather than the fluid spurting out. While this is not precisely the situation in the present case, there is little tendency for the fuel to flow by gravity alone from the motor chamber back to the liquid ring pumping chamber.

Under ordinary conditions when the fuel is being continuously pumped by the booster pump from the tank to the engine, fluid under pressure is directed by way of groove 80, port 79, groove 81, and slot 60 into the inlet chamber 56 of the liquid ring pump. Fluid flows through inlet passages 64, 64 into the pumping chamber 53. From the pumping chamber, the major portion of the fluid flows out through outlet 66 into discharge chamber 57, and through apertures 82 into the motor chamber. A small portion of the fluid flows out from the pumping chamber 53, through outlet 70, around the motor shaft, directly into the motor chamber. When the motor chamber is filled with fuel, the overflow is carried off by means of conduit 90 to some source of low pressure, preferably back to the fuel tank. This conduit corresponds to the outlet pipe 91 in the Howe pump.

When an air or vapor block occurs, before the booster pump B may resume effective operation, all of the air and vapor must be withdrawn from the booster pump inlet and the booster pump housing by the liquid ring pump. The vapors travel along the same path as the fluid just described. In order to maintain effective operation of the priming liquid ring pump, the pumping chamber must at all times be substantially filled with fluid. By the very nature of the operation of a liquid ring pump, it is unable to have any effective pumping action unless there is sufficient fluid to form the liquid "ring" and seal certain clearances within the pumping chamber. To maintain the pump chamber of the liquid ring pump filled, a portion of the fluid within the motor chamber is trapped by the deflector assembly D and is directed by way of fluid passages 85 and 68 back into the central portion of the pumping chamber 53.

Figure 5:
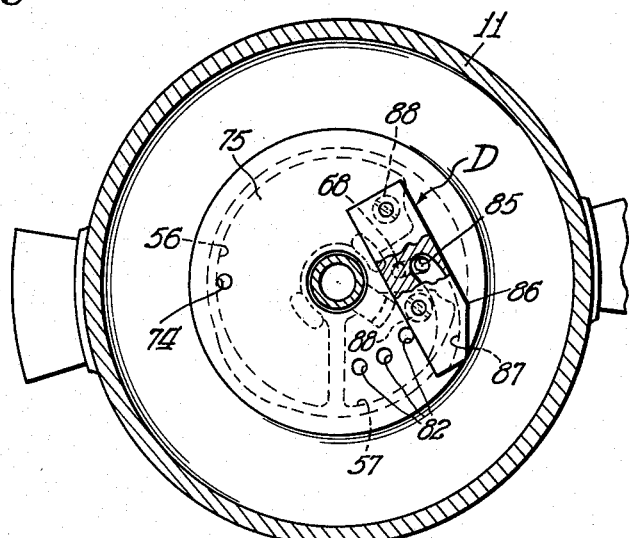
FIGURE 5 is a cross-sectional view taken along the plane of line 5—5 in FIGURE 1, partially broken to facilitate the showing thereof.
Figure 6:
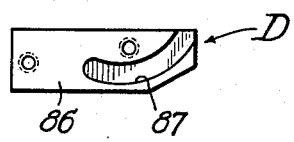
FIGURE 6 is a bottom plan view of the deflector unit.

In accordance with the present invention, the same centrifugal force which causes the problem stated above is utilized to positively direct the sealing fluid back into the fluid seal pump chamber. As best shown in FIGURE 5, the bottom wall 75 of the motor housing is provided with a passage 85 which registers with the sealing fluid return passage 68 in the lobe cone 54. Around the passage 85 there is provided a deflector assembly D which is shown in detail in FIGURE 6. This deflector assembly comprises a substantially rectangular block 86 secured to the bottom wall 75 by screws 88 and having an arcuate groove or channel 87 cut in one face thereof. The groove, together with the bottom wall 75, thus define a passage having a closed end communicating with the fluid return passages 85 and 68, and an open end opening in the direction opposite to the circular fluid flow within the motor housing.

With the structural details thus described, the operation of the entire booster pump assembly should be clear. Vapors and mixed vapors and liquid are withdrawn from the main booster pump chamber by way of groove 80, ports 79, the groove 81, and slot 60 to the inlet chamber 56 of the fluid seal pump. Fluid is discharged from the outlet chamber 57 of the fluid seal pump through passages 82 into the motor chamber to cool the same and sealing fluid is positively returned by action of the deflector through return port 85 and passage 68 to the pumping chamber 53. The latter result is accomplished by arranging the deflector to operate as a fluid trapping unit which opens in the direction opposite to circular fluid flow within the motor housing caused by the rapidly rotating armature.

It will be understood that many changes and modifications may be made without departing from the spirit and scope of the invention and that the invention is designed to be comprehended within the scope of the appended claims which should be given a scope consistent with the prior art.

What is claimed is:

1. A pump assembly comprising a motor housing; an electric motor in said housing having a rotatable armature adapted to rotate in a first direction; a drive shaft connected to said armature extending out of said motor housing; a liquid ring pump driven by said shaft, said liquid ring pump having a pumping chamber, and inlet and discharge chambers; first fluid passage means affording communication between said liquid ring pump discharge chamber and said motor housing whereby fluid from said discharge chamber is delivered to said motor housing to cool said motor and wherein said rotatable armature imparts a swirling motion in said first direction to fluid within said motor housing; second fluid passage means affording fluid communication between said motor housing and said pumping chamber; and deflector means disposed adjacent said second fluid passage means in said motor housing opening in a second direction generally opposed to said first direction for positively deflecting fluid in said motor housing swirling in said first direction into said second fluid passage means for return to said liquid ring pump pumping chamber.

2. A pump assembly comprising a motor housing having a bottom wall, an electric motor in said housing having a rotatable armature adapted to rotate in a first direction, a rotatable shaft connected to said motor armature extending through said bottom wall, a liquid ring pump driven by said shaft, said liquid ring pump having a pumping chamber and a discharge chamber, first fluid passage means affording communication between said liquid ring pump discharge chamber and said motor housing, second fluid passage means affording communication between said motor housing and said pumping chamber, whereby fluid is delivered from said pump discharge chamber to said motor housing to cool said motor and at least a portion of said fluid is continuously returned to said pumping chamber through said second fluid passage means and wherein the rotatable armature imparts a swirling motion to the fluid in said housing in said first direction, and fluid deflector means cooperating with said second fluid passage means and facing in a direction opposed to said first direction to deflect the swirling fluid into said second fluid passage means.

3. The pump assembly as defined in claim 2, wherein said deflector means comprises a generally rectangular block having an arcuate slot cut in one face thereof, said slot and the bottom wall of said housing forming an arcuate fluid passage means communicating with said second passage means.

4. A booster pump assembly comprising a generally cylindrical motor housing having a bottom wall, a central aperture in said bottom wall, an electric motor within said motor housing having a rotatable armature connected to an axially extending shaft through said central aperture, a booster pump housing, a spiral vane-type booster pump impeller within said booster pump housing driven by said shaft, a liquid ring pump between said booster pump impeller and said bottom wall of the motor housing driven by said shaft, said liquid ring pump including a pumping chamber, a fluid discharge chamber and a fluid inlet chamber, said inlet and discharge chambers formed in part by the bottom wall of said motor housing; first fluid passage means between said discharge chamber and said motor chamber, second fluid passage means between said motor housing and said pumping chamber of said liquid ring pump, a deflector assembly adjacent said second fluid passage means, said deflector assembly comprising means forming a channel having an open end opening in the direction opposite to the rotational direction of said motor armature and a closed end communicating with said second fluid passage means, and third fluid passage means affording communication between said booster pump housing and said inlet chamber of said liquid ring pump.

References Cited in the file of this patent
UNITED STATES PATENTS

| | | |
|---|---|---|
| 1,718,294 | Jennings | June 25, 1929 |
| 2,669,187 | Guyer | Feb. 16, 1954 |
| 2,925,041 | Sigmund | Feb. 16, 1960 |
| 2,925,043 | Howe | Feb. 16, 1960 |